INVENTOR.
Raphael A. Dandl 3,001,144
DIRECT COUPLED AMPLIFIER FOR SMALL CURRENTS
Raphael A. Dandl, Oak Ridge, Tenn., assignor to the United States of America as represented by the United States Atomic Energy Commission
Filed Apr. 20, 1960, Ser. No. 23,589
3 Claims. (Cl. 330—17)

This invention relates to the detection, amplification, and measurement of very small currents with transistors.

No satisfactory transistor instruments other than those which utilize a "chopper"—D.C. to A.C. converter—are known to exist for detection and measurement of very small currents; i.e., those below about $10^{-8}$ amperes. Such small currents are generated in nuclear radiation counters such as the surface barrier counter, for example, and in Faraday cup type detectors for measuring very low currents of particles from particle accelerators or from plasmas from which the particles escape. The currents are now measured with vibrating reed or vacuum tube electrometers. It has heretofore been believed that no suitable transistorized instrument could be designed because of the extremely low current amplification (B) characteristics of transistors at such low input (base) currents. See "Proceedings I.R.E.," June 1954, p. 914, where "B" is denoted $\alpha_{cb}$.

Present instruments are not completely satisfactory. They are complex and expensive, in many cases, and do not have the long life of transistors. They are also temperature sensitive and are influenced by vibration and stray fields.

With a knowledge of the shortcomings of prior current detection and measurement in the prior art, it is an object of this invention to provide a transistorized instrument which can operate on currents below about $10^{-8}$ amperes accurately, dependably, and with good stability. Other objects of the invention will become apparent from a consideration of the following description of a preferred embodiment thereof, when read in conjunction with the attached drawings, wherein.

Figure 2:
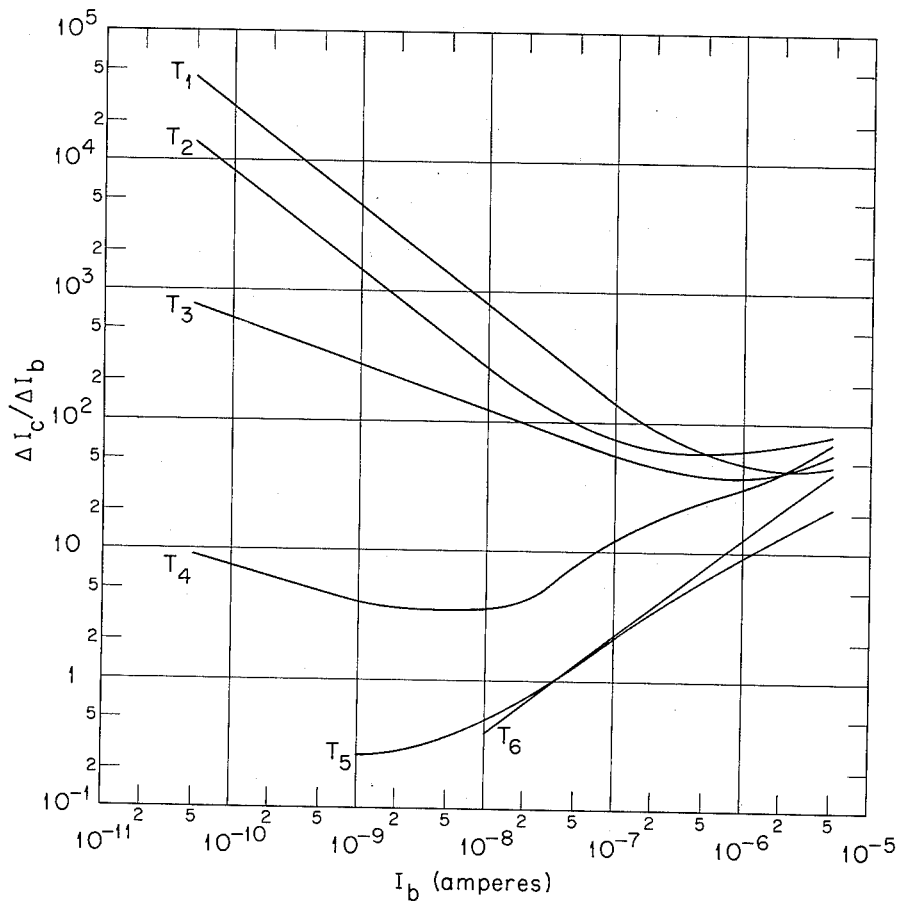
FIG. 2 is a graph showing the current amplification (B) as a function of base current $I_b$; and, FIG. 3 is a schematic circuit diagram of a preferred device.

Referring now to the figures, characteristic curves are plotted for representative transistors of types 2N336 and 2N338. The collector voltage was adjusted to a selected voltage with a potentiometer connected to a supply voltage, the emitter was grounded, and the base current was varied in increments by changing the circuit resistance between the supply voltage and the base from $10^6$ to $10^{11}$ ohms. The collector current was measured directly and plotted as a function of the base current, FIG. 1. The ratio of the incremental change in collector current to the corresponding increment of base current $$\frac{\Delta I_c}{\Delta I_b} = B$$

was calculated and plotted as FIG. 2.

Figure 1:
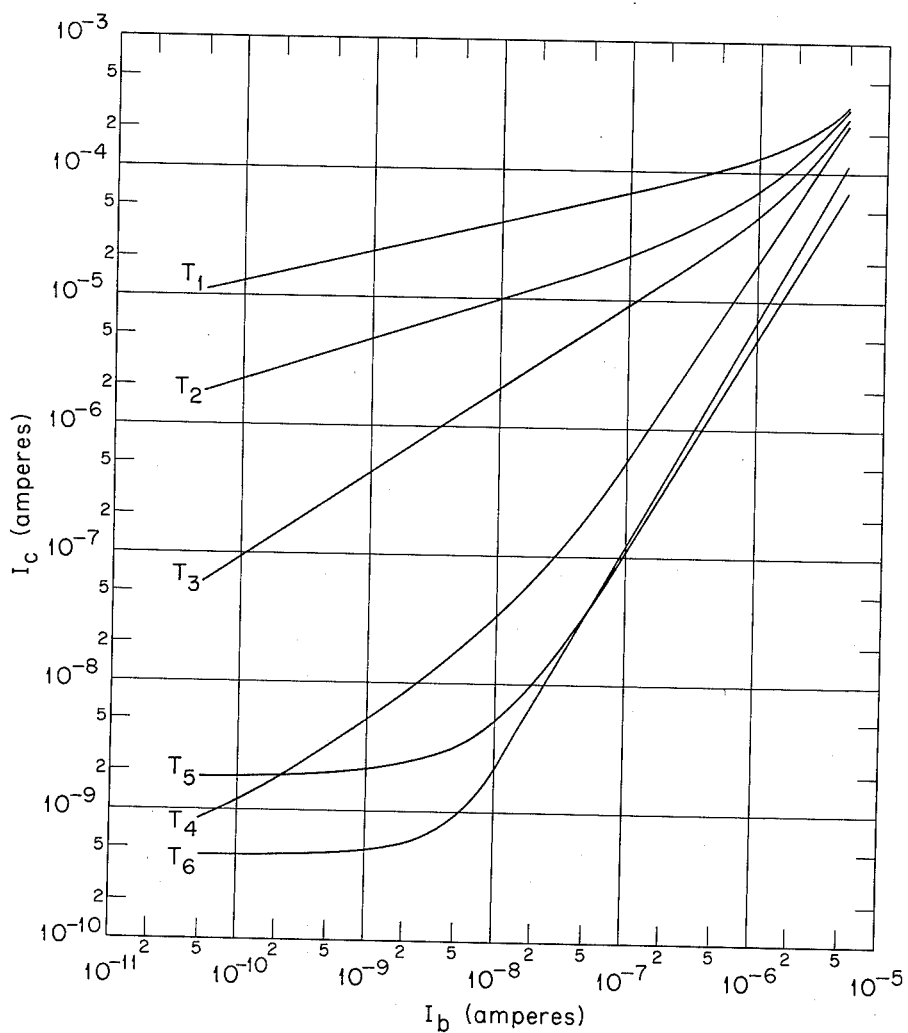
FIG. 1 is a graph showing the relationship between collector current $I_c$ and base current $I_b$ for a selected number of transistors.

Referring now to FIG. 1, at base currents of about $5 \times 10^{-5}$ amperes and above the collector currents of all transistors tested were very close to the same value, as expected. Below that value, however, the slopes of the curves unexpectedly diverge markedly. Referring to FIG. 2, the ratio B was almost the same at currents of $5 \times 10^{-6}$ amperes, but diverged rapidly thereafter. For the great majority of transistors tested, the ratio declined as expected, as shown with $T_4$, $T_5$ and $T_6$, but for a few, the ratio rose surprisingly to over 10,000 at base currents of $5 \times 10^{-10}$ amperes. Below $5 \times 10^{-10}$ amperes, the plotted curves of FIG. 2 flatten out, so that the maximum values shown are substantially equal to $B_0$, where $I_b = 0$.

In FIGS. 1 and 2, transistors $T_1$ was type 2N338, and the measured collector current with the base floating, $I_{ceo}$, was $9.0 \times 10^{-6}$ amperes. Thus it is apparent that the curves of FIG. 1 also flatten out at values of $I_b$ below $5 \times 10^{-10}$. The other transistor types and collector currents, in amperes, with their bases floating were as follows: $T_2$—2N336—$9.4 \times 10^{-7}$; $T_3$—2N336—$2.2 \times 10^{-8}$; $T_4$—2N338—$5 \times 10^{-10}$; $T_5$—2N336—$1.9 \times 10^{-9}$; $T_6$—2N338—$4.6 \times 10^{-10}$. The data were taken at room temperature (about 75° F.) and with a collector-emitter voltage of $+0.5$ volt. The transistors tested were all within manufacturers' specifications at normal operating currents. The characteristics are quite reproducible.

These limiting factors in usefulness of transistors for low currnet measurements are (1) stability or drift of the transistor currents, which masks variations in input signal; (2) the residual current, or current which flows in the collector circuit with the base floating ($I_{ceo}$), and which tends to mask the signal; and (3) the current amplification (B). As is noted above, B falls off rapidly for low base currents. For example, assume an input signal of $10^{-9}$ amperes is to be detected and measured accurately. The collector current of ordinary good transistors, such as $T_5$, as shown in FIG. 1, is about $2 \times 10^{-9}$ amperes for all values of $I_b$ below $10^{-9}$ amperes. The curves of FIG. 2 shows that an input signal of $10^{-9}$ amperes would produce no difference in collector current from an input of $10^{-10}$ amperes, or from zero input. Both the slope of the curve and the measured value of $I_{ceo}$ indicate no change from input signals of 0 to above $10^{-9}$ amperes. The small changes in $I_c$ that occur below about $10^{-7}$ amperes $I_b$ are below $10^{-7}$ amperes, and cannot be detected or measured with any degree of accuracy because normal drift of the transistor resulting from normal temperature changes results in collector current changes of the order of $10^{-7}$ amperes. It is for just such reasons that transistors are not used as low current detectors and amplifiers.

I have discovered that some few transistors from types 2N336 and 2N338, upon testing as described above, unexpectedly exhibit a marked increase in current amplification B for the range of values of $I_b$ below about $10^{-6}$ amperes. It was believed previously that the value of B continue to drop in that range and consequently the transistors were useless. My discovery is dramatically illustrated in the upswing of curves $T_1$, $T_2$, and $T_3$, and in the greatly reduced slope of curve $T_1$, $T_2$ and $T_3$ of FIG. 2. Whereas for ordinary good transistors such as $T_5$ the ratio $$\frac{I_{ceo}}{B}$$

is greater than about $$\frac{1.9 \times 10^{-9}}{3 \times 10^{-1}} \cong 6 \times 10^{-7}$$

I have found transistors having a ratio $$\frac{I_{ceo}}{B} = \frac{2.2 \times 10^{-8}}{10^3} = 2.2 \times 10^{-11} (T_3)$$

and below ($T_2$ and $T_1$), an improvement factor of almost 10,000.

The ratio $$\frac{I_{ceo}}{B}$$

may be considered as a figure of merit analogous to grid current in an electrometer tube, in that the signal received at the base will tend to be masked or obscured by an amount proportional to that ratio. A high value of B is desired, with a low residual $I_{ceo}$. The current that can be measured with stability is equal to that ratio. Variations of about $10^{-2}$ times that ratio can be seen and measured, but not with the desired degree of confidence in the result. Using transistors of the unique property I have discovered, input currents of the order of $10^{-12}$ amperes can be detected and measured accurately, that is, the figure of merit $$\frac{I_{ceo}}{B}$$

is of the order of $10^{-12}$; whereas heretofore currents of below $10^{-8}$ amperes were not accurately measurable.

Having demonstrated for the first time that high current amplifications can be obtained in some transistors at extremely low base currents, and over a considerable range of base currents below $10^{-7}$ amperes, and that the residual collector currents $I_{ceo}$ were not so great in those transistors as to mask such small signals, I have provided a novel amplifier for detecting, amplifying, and measuring small currents. The first stage utilizes one of these unusual "selected" transistors, having a figure of merit $$\frac{B}{I_{ceo}}$$

of at least the magnitude of the current to be measured. The second stage preferably uses a selected transistor having an $$\frac{B_1}{I_c}$$

at least the reciprocal of the residual current $I_{ceo}$ in the first stage. The remaining transistors need not be "selected" ones, because the signal level is great enough so that the unusual small signal response is not required.

Figure 3:
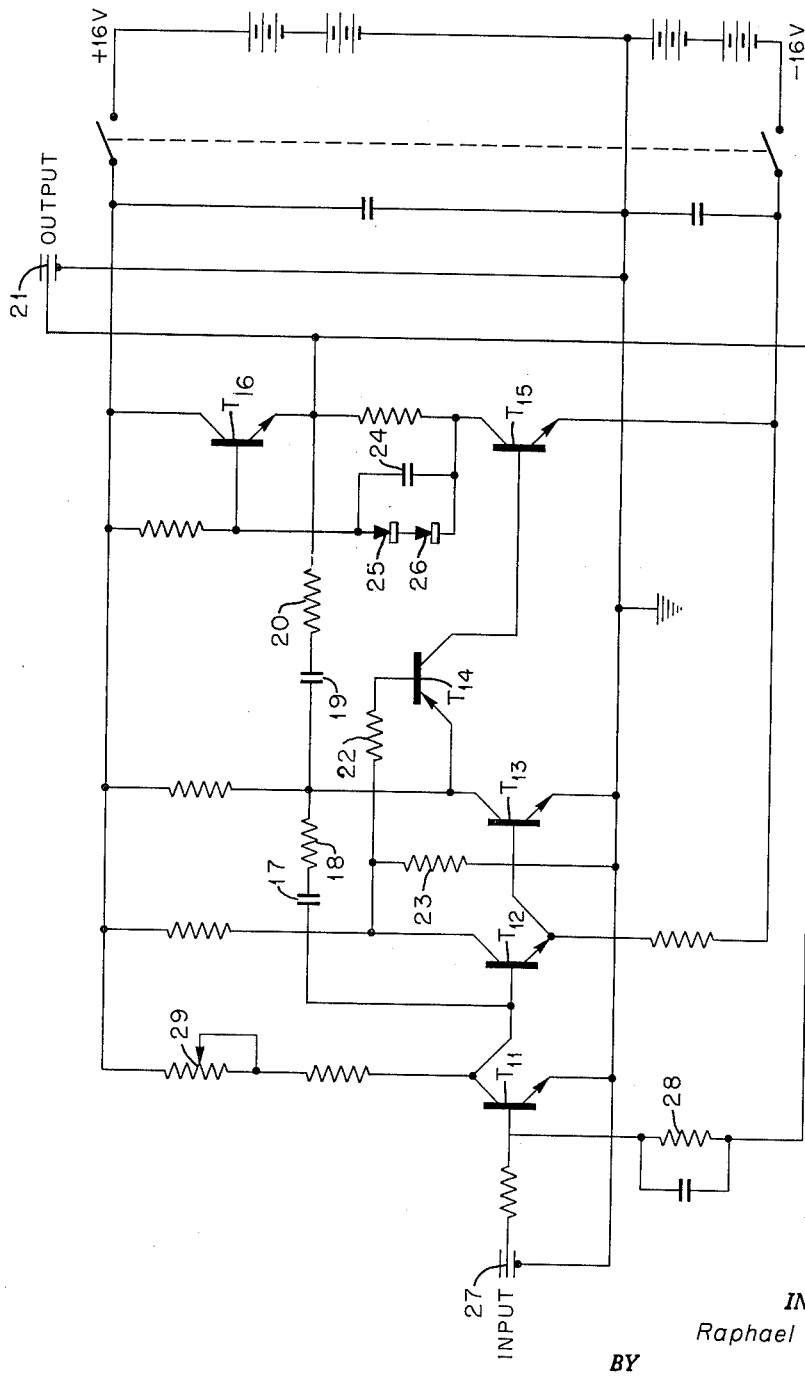

Referring to FIG. 3, the small current from a detector (current generator) is applied to the base of "selected" transistor $T_{11}$, which is a grounded-emitter amplifier, through input 27. The signal at the collector is coupled (a) to the base of "selected" transistor $T_{12}$ for further amplification and (b) through two phase-advance networks 17—18, and 19—20 to the collector of $T_{13}$ and the output 21, to stabilize the amplifier at high frequencies. $T_{12}$ is an emitter-follower stage having its output signal from its emitter connected to the base of grounded-emitter stage $T_{13}$. The output from the collector of $T_{13}$ is connected to the emitter of $T_{14}$, the base of which is held at a constant potential by means of divider network 22, 23. The collector of $T_{14}$ is connected to the base of $T_{15}$, so that any current change at the output (collector) of $T_{13}$ will be transferred to the base of $T_{15}$, even though the respective voltage levels are significantly different. The base of emitter-follower $T_{16}$ is coupled to the collector (output) of $T_{15}$ through condenser 24 and diodes 25, 26. Output 21 is connected to the emitter of $T_{16}$ and back to the input 27 through feedback resistor 28. A standard power supply furnishes ±16 volt and ground potentials, so that the output may swing to either ±15 volts.

In operation, an input signal of either polarity may be received at input 27. The gain of the amplifier may be adjusted by changing the feedback resistor 28 to provide the optimum gain for the signals to be measured. Feedback resistor values of $10^6$—$10^{12}$ ohms are commonly used. The collector current to $T_{11}$ is first adjusted, through potentiometer 29, to bring the voltage output 21 to zero when no signal is impressed on input 27. Assume a negative signal current is received, driving the $T_{11}$ base more negative, reducing the collector current, raising the base potential of $T_{12}$. The potential of the $T_{12}$ emitter rises correspondingly as does that of the $T_{13}$ base. This drops the $T_{13}$ collector potential and that of the $T_{14}$ emitter, while the $T_{14}$ base potential remains constant, so that the $T_{14}$ collector drops by an amount corresponding to the emitter drop. Note $T_{14}$ is a P-N-P transistor. As the base potential of $T_{15}$ drops, less collector current flows in $T_{15}$. The resulting rise in collector voltage is coupled to the $T_{16}$ base, causing it to draw more current to balance the decrease in $T_{15}$ current. The phase advance networks 17, 18 and 19, 20 stabilize the amplifier at high frequencies to prevent oscillation.

Assume a current of $10^{-10}$ amperes is to be measured. A transistor is selected which has a ratio $$\frac{I_{ceo}}{B} \text{ of } 10^{-10}$$

or smaller. If one of the group of transistors of which $T_3$ is representative is selected, for example, FIG. 3 shows that $$\frac{I_{ceo}}{B} \cong \frac{2.2 \times 10^{-8}}{8 \times 10^2} \cong 2 \times 10^{-11}$$

A transistor from the better groups $T_1$ and $T_2$ would obviously also be satisfactory. For $T_{11}$ the value of $I_{ceo} = 2.2 \times 10^{-8}$ amperes is the current which will flow to the base of $T_{12}$ in the absence of an input to $T_{11}$. Therefore the ratio $$\frac{I_c}{B_1} \text{ for } T_{12}$$

should be $2.2 \times 10^{-8}$ or smaller, where $B_1$ is the value of B for $I_b = 2.2 \times 10^{-8}$. From FIGS. 1 and 2 it is observed that at $I_b = 2.2 \times 10^{-8}$ amperes, the ratio for $T_3$ is $$\frac{2 \times 10^{-6}}{1.4 \times 10^2} = 1.4 \times 10^{-8}$$

so that $T_3$ would be satisfactory. $T_1$ or $T_2$ would also be satisfactory. For $T_4$, the ratio is $$\frac{3 \times 10^{-8}}{4} = .75 \times 10^{-8}$$

so that $T_4$ is also satisfactory. For the ordinary unselected transistors $T_5$, the ratio is $$\frac{4 \times 10^{-6}}{5 \times 10^{-1}} = 8 \times 10^{-7}$$

so that $T_5$ would be generally unsatisfactory, and one of the groups $T_1$—$T_4$ should be used for accuracy. The remaining transistors may be unselected without affecting the accuracy of the amplifier. In a preferred embodiment tested, $T_1$ was a 2N338 transistor having a B of greater than $10^4$ and $I_{ceo}$ of $2 \times 10^{-6}$ amperes, so that the ratio was $2 \times 10^{-10}$. $T_2$ was a type 2N336 having a B greater than 300 and an $I_{ceo}$ of $5 \times 10^{-8}$ amperes, with a ratio of $1.7 \times 10^{-10}$.

Having described my invention, what is claimed as novel is:

1. An amplifier for accurately measuring input currents of magnitude about $10^{-N}$ amperes where N is greater than 8, which comprises a plurality of transistors, each having emitter, collector, and base terminals; an input terminal; a first, common emitter transistor having its base coupled to said terminal to receive said input current; a second, emitter-follower transistor having its base coupled to the collector of said first transistor; a third, common emitter transistor having its base connected to the emitter of said second transistor; a source of potential providing an intermediate reference ground; fourth and fifth transistors of the same conductivity type, the collector of the fifth transistor being coupled to the emitter of the fourth transistor and the emitter-collector circuit paths connected in series across said source; an output terminal connected to the emitter of said fourth transistor; a voltage divider network connected between one terminal of said potential source and ground; a sixth, coupling transistor complementary to said third and fifth transistors having its emitter connected to the collector of said third transistor, its collector connected to the base of said fifth transistor, and its base coupled to said voltage divider network; said first transistor having a characteristic ratio $$\frac{B}{I_{ceo}}$$

of at least $10^N$, where B is the current amplification for base current of $10^{-N}$ amperes, and $I_{ceo}$ is the collector current with 0.5 volt potential impressed between emitter and collector and the base open-circuited; said second transistor having a characteristic ratio $$\frac{B_1}{I_c}$$

of at least $$\frac{1}{I_{ceo}}$$

where $B_1$ is the current amplification for base currents equal to $I_{ceo}$ and $I_c$ is the collector current; and a feedback resistor connected between said output terminal and the base of said first transistor.

2. A feedback amplifier for small currents of about $10^{-N}$ amperes, where N is greater than 8, which comprises an input; a plurality of current amplifying transistor stages connected in cascade and having an output stage, at least the first and second stages being provided with selected first and second transistors characterized respectively by ratios $$\frac{B}{I_{ceo}}$$

of at least $10^N$ and $$\frac{B}{I_c}$$

of at least $$\frac{1}{I_{ceo}}$$

where B is the current amplification for base currents of $10^{-N}$ amperes, $B_1$ is the current amplification at base currents of amount equal to $I_{ceo}$, and $I_{ceo}$ is the collector current with 0.5 volt potential impressed between emitter and collector and the base open-circuited; a double-ended output circuit comprising third and fourth transistors of the same conductivity type, the collector of the fourth transistor being coupled to the emitter of the third transistor; said coupling being through an intermediate resistance; a feedback resistor connected between said input and said resistance; a voltage source; a voltage divider connected across said source; and a coupling transistor complementary to said fourth transistor and the transistor comprising said output stage having its base connected to said divider, its emitter input connected to said output stage of said amplifying stages, and its collector output connected to the base input of said fourth transistor, the amplifier output being taken at the emitter of said third transistor.

3. In a transistor amplifier, first, second, and third current amplifying transistors of a first conductivity type connected in cascade and provided with an input and an output; a source of energizing potential; an output circuit comprising fourth and fifth transistors of said first conductivity type, each of said transistors having an emitter, a collector, and a base, the collector of said fifth transistor being resistance coupled to the emitter of said fourth transistor and the emitter-collector circuit paths connected across said potential source; means connecting the collector of said fifth transistor to the base of said fourth transistor; means for deriving an output signal from the emitter of said fourth transistor; a sixth transistor of complementary conductivity type having an emitter connected to said amplifying stages output, a collector connected to the base of said fifth transistor, and a base; a voltage divider network connected between one terminal of said source and ground; and means connecting the base of said sixth transistor to said voltage divider.

References Cited in the file of this patent

UNITED STATES PATENTS 2,889,416     Shea  ---------------- June 2, 1959

OTHER REFERENCES

Aronson et al.: "Transformerless Transistorized A-F Power Amplifier has 7-W Output," August 1958, Instruments and Automation, page 1371.